United States Patent Office 3,053,848
Patented Sept. 11, 1962

3,053,848
1-(DI-LOWER ALKYL-AMINOPHENYL-LOWER ALKYLENE)-2-(5-LOWER ALKYL - 3 - ISOXAZOLYLCARBONYL) HYDRAZINES
Thomas Samuel Gardner, Rutherford, John Lee, Essex Fells, and Edward Wenis, Leonia, N.J., assignors to Hoffmann-La Roche Inc., Nutley, N.J., a corporation of New Jersey
No Drawing. Filed May 12, 1959, Ser. No. 812,692
5 Claims. (Cl. 260—307)

This invention relates to 1-(di-lower alkyl-aminophenyl-lower alkylene)-2-(5-lower alkyl-3-isoazolylcarbonyl)hydrazines. The lower alkyl groups in the compounds of this invention include straight chain and branched chain saturated hydrocarbon groups, such as methyl, ethyl, propyl, isopropyl, butyl, isobutyl, amyl, isoamyl and the like. The lower alkylene group refers to similar straight chain and branched chain saturated hydrocarbon radicals having a free bond available at each chain end for attachment to the nitrogen atom and to the phenyl group, respectively. The di-lower alkyl-amino group may be attached to either the ortho, meta or para position of the phenyl ring. A preferred subgroup of compounds is 1-(di-lower alkyl-aminophenyl-lower alkylene)2-(5-methyl - 3-isoxazolylcarbonyl)hydrazine and especially 1-(di-lower alkyl-aminobenzyl)-2 - (5-methyl-3-isoxazolylcarbonyl)hydrazine.

The products of this invention form acid addition salts with various inorganic and organic acids. Salts containing one or more acid groups may be produced. Such salts are also within the scope of this invention. Acid addition salts which are illustrative include the hydrohalides, e.g. hydrochloride, hydrobromide, hydroiodide, etc., other mineral acid salts, e.g. sulfate, phosphate, nitrate, etc., alkyl and aralkyl sulfonates, e.g. ethanesulfonate, benzenesulfonate, toluenesulfonate, etc., and other acid salts such as tartrate, citrate, salicylate, ascorbate, malate, mandelate, etc. The hydrohalides, and in particular the hydrochloride, are preferred. The acid addition salts are prepared by reacting the base with the appropriate acid, preferably an excess of the latter and in an inert solvent, and recovering the product by conventional means from the reaction mixture, e.g. by evaporation of the solvent.

The 1-(di-lower alkyl-aminophenyl-lower alkylene)-2-(5-lower alkyl-3-isoxazolylcarbonyl)hydrazines may be produced by reacting 5-lower alkyl-3-isoxazole carboxylic acid hydrazide with an aldehyde or ketone having the requisite di-lower alkyl-aminophenyl-lower alkylene configuration, preferably in an inert organic solvent such as ethanol, thereby producing as an intermediate 1-(di-lower alkyl-aminophenyl-lower alkylidene)-2-(5-lower alkyl-3-isoxazolylcarbonyl)hydrazine. The intermediate compound is then selectively reduced, e.g. with lithium aluminum hydride in ether or with sodium borohydride or potassium borohydride in an aqueous alcohol to produce the desired end product. The end product may be separated from the reaction mixture by conventional techniques such as removing the spent reducing agent and solvent extracting, precipitating, etc.

The compounds of this invention are monoamine oxidase inhibitors, that is, they inhibit the activity of monoamine oxidase in the brain which effects the deactivation of such physiological regulators are serotonin, tryptamine, epinephrine, etc., and stimulate the central nervous system. Some of the compounds of this invention have a long acting effect, whereas others have a short acting effect and thereby provide a broad spectrum to meet specific needs. They are particularly useful for relief of disturbed states in psychotherapy. The bases, or medicinally acceptable acid addition salts thereof, may be administered orally or parenterally in conventional solid or liquid dosage forms, such as tablets, capsules, injectables, etc., comprising therapeutic dosages incorporated in conventional solid or liquid vehicles, either with or without excipients.

The following examples are illustrative of the invention. All temperatures are stated in degrees centigrade.

*Example 1*

A 3-necked, 12-liter flask fitted with two high capacity condensers, two dropping funnels and an efficient stirrer was set up in such a manner that the reaction mixture could be cooled or heated. 25 g. of acetonylacetone, 88 ml. of concentrated nitric acid and 187 ml. of water were mixed and placed in the reaction flask. 325 g. of acetonylacetone were placed in one dropping funnel and a mixture of 1144 ml. of concentrated nitric acid with 2440 ml. of water were placed in the second dropping funnel. Oxidation was initiated by heating the solution in the flask. As soon as the initial reaction started to subside, the reactants were added at a rate of approximately 8 ml. per minute of acetonylacetone and 80 ml. per minute of dilute nitric acid.

After the final addition of the reactants, the mixture was cautiously stirred for a few minutes and the flask was gently heated. The mixture was refluxed for 30 minutes and cooled to —15°. The colorless crystals which precipitated were filtered off, washed twice with 250 ml. portions of ice water and dried at 60° over phosphorus pentoxide. The 5-methyl-3-isoxazole carboxylic acid sintered at 173° and melted at 175–176°.

710 g. of 5-methyl-3-isoxazole carboxylic acid, 7.1 liters of ethanol, and 825 ml. of 96% sulfuric acid were mixed while agitating. The temperature of the liquid rose to 45–60°. Stirring was continued for 15 minutes and the solution was then permitted to stand for 24 hours. The esterification solution was concentrated at 60° under vacuum to a volume of 3.5 liters and poured into 10 liters of cracked ice. The solution was then neutralized with 1.8 liters of 28% ammonium hydroxide. The slightly alkaline solution was then extracted with ether in two portions of two liters each and then with ether in four portions of one liter each.

The six ether extracts were combined and concentrated under light vacuum to obtain crude ethyl 5-methyl-3-isoxazole carboxylate. The crude ester was then vacuum distilled at 13 to 14 mm. to obtain the pure ester, B.P. 115–117°.

733 g. of ethyl 5-methyl-3-isoxazole carboxylate were dropped in at room temperature into 875 g. of 85% hydrazine hydrate. The internal temperature rose to 45–50°. The solution was stirred for four hours, then permitted to stand for 16 hours at 25°. The mixture was filtered and the mother liquor concentrated under vacuum to a solid. The combined yield of crude 5-methyl-3-isoxazole carboxylic acid hydrazide thus obtained was dissolved in 1.2 liters of hot ethanol and cooled to yield a white, crystalline product melting at 142–143°.

300 g. of 5-methyl-3-isoxazole carboxylic acid hydrazide were added to 1.5 liters of ethanol. The mixture was heated until complete solution was obtained. 375 g. of 4-dimethylaminobenzaldehyde were added to the solution and heated on a steam bath for 3 hours with occasional stirring. The ethanol was permitted to evaporate until a volume of about 500 ml. of liquid remained. The resulting suspension was permitted to cool to 25° and the product, 1-(4-dimethylaminobenzylidene)-2 - (5 - methyl-3-isoxazolylcarbonyl)hydrazine, was recovered by filtration and washed twice on the filter with 500 ml. portions of ethanol. The yellow product was dried in air, M.P. 212–213°.

20.5 g. of lithium aluminum hydride were dissolved in 2.27 kg. of ether. 147 g. of 1-(4-dimethylaminobenzylidene)-2-(5-methyl-3 - isoxazolylcarbonyl)hydrazine were added to the solution gradually over a period of one hour. The reaction mixture was stirred for two hours and then permitted to stand at room temperature overnight. 150 ml. of ethyl acetate were added to destroy the excess lithium aluminum hydride. 100 ml. of water were added and the mixture was then filtered. The filter cake was extracted with 1.5 liters of boiling benzene. The benzene layer and the ether layer obtained from the filtrate were combined and concentrated to an oil. The oil was added to ethanol from which the product, 1-(4-dimethylaminobenzyl)-2-(5-methyl - 3 - isoxazolylcarbonyl)hydrazine, crystallized, M.P. 131–132°.

250 mg. of 1-(4-dimethylaminobenzyl)-2-(5-methyl-3-isoxazolylcarbonyl)hydrazine were dissolved in 5 ml. of ethanol. 2 ml. of HCl in propanol-2 were added to the solution. 1-(4-dimethylaminobenzyl) - 2 - (5-methyl-3-isoxazolylcarbonyl)hydrazine hydrochloride immediately crystallized. The product melted at 180–181°.

1-(4-dimethylaminobenzyl)-2-(5-methyl - 3-isoxazolylcarbonyl)hydrazine phosphate was prepared in the same manner by dissolving the base in ethanol and adding 85% phosphoric acid.

*Example 2*

222 g. of 4-diethylaminobenzaldehyde and 500 ml. of ethanol were heated with 177 g. of 5-methyl-3-isoxazole carboxylic acid hydrazide in 1.0 liter of ethanol at 80° for 4 hours. The reaction mixture was permitted to stand for 2 days and a solid product precipitated. The 1-(4-diethylaminobenzylidene) - 2-(5-methyl-3-isoxazolylcarbonyl)hydrazine was separated by filtration and crystallized from ethanol, M.P. 169–170°.

150 g. of 1-(4-diethylaminobenzylidene)-2-(5-methyl-3-isoxazolylcarbonyl)hydrazine were treated in 2.0 liters of methanol and 350 ml. of water with 54 g. of potassium borohydride added over a period of ½ hour. After the final addition of the potassium borohydride, the solution was stirred for one hour. Excess potassium borohydride was then destroyed by the addition of 100 ml. of acetic acid. The solution was evaporated to dryness in vacuo and the solid residue was extracted three times with benzene using 1 liter of benzene for each extraction. The benzene was removed by distillation in vacuo and the residue thus obtained was crystallized from methanol. The product, 1-(4-diethylaminobenzyl) - 2 - (5-methyl-3-isoxazolylcarbonyl)hydrazine was then recrystallized from ethanol, M.P. 74–75°.

*Example 3*

25 g. of 3-dimethylaminobenzaldehyde, 23.9 g. of 5-methyl-3-isoxazole carboxylic acid hydrazide and 1.0 g. of p-toluene sulfonic acid and 200 ml. of ethanol were refluxed for 2 hours. On cooling, the product, 1-(3-dimethylaminobenzylidene) - 2 - (5-methyl-3-isoxazolylcarbonyl)hydrazine, precipitated and after filtration was recrystallized from ethanol, M.P. 192–193°.

40 g. of 1-(3-dimethylaminobenzylidene)-2-(5-methyl-3-isoxazolylcarbonyl)hydrazine were treated in 647 ml. of methanol and 114 ml. of water with 16 g. of potassium borohydride. The potassium borohydride was added in small portions over a period of 30 minutes. Complete solution was obtained after 2 hours of stirring. 50 ml. of acetic acid were then added to decompose unreacted potassium borohydride. The solution was concentrated to 200 ml. An oily layer and water was thus obtained. The oil was separated by decantation, crystallized from methanol and then recrystallized from ethanol. The product, 1-(3-dimethylaminobenzyl) - 2 - (5-methyl-3-isoxazolylcarbonyl)hydrazine melted at 95–96°.

*Example 4*

17 g. of 5-methyl-3-isoxazolyl carboxylic acid hydrazide, 1.0 g. of p-toluene sulfonic acid catalyst and 18 g. of 2-dimethylaminobenzaldehyde were heated at 78° for 2 hours in 200 ml. of ethanol. The reaction mixture was permitted to cool and then extracted with hot water. The product, 1-(2-dimethylaminobenzylidene) - 2 - (5-methyl-3-isoxazolylcarbonyl)hydrazine, was crystallized from ethanol, M.P. 194–195°.

1.16 g. of 1-(2-dimethylaminobenzylidene) - 2 - (5-methyl-3-isoxazolylcarbonyl)hydrazine were suspended in 200 ml. of ether. This suspension was slowly dropped into a solution of 175 mg. of lithium aluminum hydride in 100 ml. of ether. The mixture was stirred for 4 hours. 15 ml. of ethyl acetate, then 5 ml. of water were added. The mixture was again stirred for 1 hour, then filtered. The filtrate was evaporated to dryness leaving a semicrystalline mass as residue. This residue was taken up in 25 ml. of ethanol. The addition of petroleum ether precipitated the product, 1-(2-dimethylaminobenzyl)-2-(5-methyl-3-isoxazolylcarbonyl)hydrazine, which was recrystallized in the same manner with ethanol and petroleum ether, M.P. 106–107°.

We claim:

1. A compound selected from the group consisting of 1-(di-lower alkyl-aminophenyl-lower alkylene)-2-(5-lower alkyl-3-isoxazolylcarbonyl)hydrazine and medicinally acceptable acid addition salts thereof.

2. 1-(4-dimethylaminobenzyl) - 2 - (5-methyl-3-isoxazolylcarbonyl)hydrazine.

3. 1-(4-diethylaminobenzyl)-2-(5-methyl - 3 - isoxazolylcarbonyl)hydrazine.

4. 1-(3-dimethylaminobenzyl) - 2 - (5-methyl-3-isoxazolylcarbonyl)hydrazine.

5. 1-(2-dimethylaminobenzyl)-2-(5-methyl - 3 - isoxazolylcarbonyl)hydrazine.

References Cited in the file of this patent

UNITED STATES PATENTS 2,908,688    Gardner et al. _____ Oct. 13, 1959

OTHER REFERENCES

Offe et al.: Z. Naturforsch, vol. 7(b), pages 446 to 447 and 451 to 452 (1952).

Yale et al.: Journ. of the American Chem. Soc., vol. 75, pages 1933 to 1938 (1953).

Sacconi: Journ. of the American Chemical Society, vol. 76, pages 3400 to 3402 (1954).

Gardner et al.: Journal of Organic Chemistry, vol. 21, pages 530 to 533 (1956).